(12) United States Patent
Ogino et al.

(10) Patent No.: US 11,446,639 B2
(45) Date of Patent: Sep. 20, 2022

(54) EXHAUST GAS PURIFICATION CATALYST, EXHAUST GAS PURIFICATION METHOD, AND PRODUCTION METHOD FOR EXHAUST GAS PURIFICATION CATALYST

(71) Applicant: UMICORE SHOKUBAI JAPAN CO., LTD., Tokoname (JP)

(72) Inventors: Yuji Ogino, Kobe (JP); Yusuke Haneda, Kobe (JP)

(73) Assignee: UMICORE SHOKUBAI JAPAN CO., LTD., Tokoname (JP)

( * ) Notice: Subject to any disclaimer, the term of this patent is extended or adjusted under 35 U.S.C. 154(b) by 0 days.

(21) Appl. No.: 17/264,916

(22) PCT Filed: Sep. 24, 2019

(86) PCT No.: PCT/JP2019/037244
§ 371 (c)(1),
(2) Date: Feb. 1, 2021

(87) PCT Pub. No.: WO2020/067000
PCT Pub. Date: Apr. 2, 2020

(65) Prior Publication Data
US 2021/0299638 A1    Sep. 30, 2021

(30) Foreign Application Priority Data
Sep. 28, 2018   (JP) .............................. JP2018-185081

(51) Int. Cl.
*B01D 53/94* (2006.01)
*B01J 21/04* (2006.01)
(Continued)

(52) U.S. Cl.
CPC .......... *B01J 23/63* (2013.01); *B01D 53/9468* (2013.01); *B01J 21/04* (2013.01); *B01J 35/0006* (2013.01);
(Continued)

(58) Field of Classification Search
CPC ...... B01J 23/63; B01J 37/0228; B01J 37/082; B01J 37/0201; B01J 35/0006; B01J 23/58;
(Continued)

(56) References Cited

U.S. PATENT DOCUMENTS

| 5,015,617 A | 5/1991 | Ohata et al. |
| 8,066,963 B2 * | 11/2011 | Klingmann ............. F01N 3/035 |
| | | 423/247 |

(Continued)

FOREIGN PATENT DOCUMENTS

| EP | 1053779 A1 | 11/2000 |
| EP | 2 301 661 A1 | 3/2011 |

(Continued)

OTHER PUBLICATIONS

International Search Report (PCT/ISA/210) and an English translation thereof, and Written Opinion (PCT/ISA/237) dated Dec. 17, 2019, by the Japanese Patent Office as the International Searching Authority for International Application No. PCT/JP2019/037244.

(Continued)

*Primary Examiner* — Timothy C Vanoy
(74) *Attorney, Agent, or Firm* — Buchanan Ingersoll & Rooney PC

(57) ABSTRACT

An exhaust gas cleaning catalyst is provided with a fire-resistant three-dimensional structural body, a first catalyst layer provide on a first surface side of the fire-resistant three-dimensional structural body, and a second catalyst layer provided on a side of the first catalyst layer opposite to the fire-resistant three-dimensional structural body. The first catalyst layer contains: a complex oxide including cerium and zirconium; and elemental rhodium. The second catalyst layer contains: a complex oxide including cerium and zirconium; and elemental palladium. The amount of cerium (Continued)

included in the second catalyst layer, in terms of cerium dioxide, is 10-25 g per liter of the fire-resistant three-dimensional structural body.

10 Claims, 4 Drawing Sheets

(51) Int. Cl.
    *B01J 23/63*     (2006.01)
    *B01J 35/00*     (2006.01)
    *B01J 35/02*     (2006.01)
    *B01J 35/10*     (2006.01)
    *B01J 37/04*     (2006.01)
    *B01J 37/08*     (2006.01)
    *C01B 3/26*     (2006.01)
    *F01N 3/28*     (2006.01)

(52) U.S. Cl.
    CPC ......... *B01J 35/023* (2013.01); *B01J 35/1014* (2013.01); *B01J 35/1019* (2013.01); *B01J 37/04* (2013.01); *B01J 37/082* (2013.01); *C01B 3/26* (2013.01); *B01D 2255/1023* (2013.01); *B01D 2255/1025* (2013.01); *B01D 2255/2061* (2013.01); *B01D 2255/2065* (2013.01); *B01D 2255/2092* (2013.01); *B01D 2255/20715* (2013.01); *B01D 2255/407* (2013.01); *B01D 2255/9022* (2013.01); *C01B 2203/1005* (2013.01); *C01B 2203/1064* (2013.01); *F01N 3/2803* (2013.01); *F01N 2370/02* (2013.01)

(58) Field of Classification Search
    CPC .. B01J 35/023; B01J 37/0248; B01J 37/0244; B01J 35/1014; B01J 35/04; B01J 23/10; B01J 21/066; B01J 21/04; B01J 23/464; B01J 37/04; B01J 35/1019; B01J 37/0215; F01N 2370/02; F01N 3/28; F01N 3/10; B01D 2255/9022; B01D 53/9468; B01D 2255/1025; B01D 2255/2065; B01D 2258/014; B01D 2255/908; B01D 2255/1023; B01D 53/945; B01D 2255/2061; C01B 3/384; C01B 2203/1082; C01B 2203/1064; C01B 2203/0233; C01B 2203/1005; C01B 2203/0283; C01B 3/26; Y02P 20/52; Y02T 10/12
See application file for complete search history.

(56) References Cited

U.S. PATENT DOCUMENTS

| | | | |
|---|---|---|---|
| 8,968,690 B2* | 3/2015 | Nunan | B01J 35/1019 422/177 |
| 10,159,934 B2* | 12/2018 | Kitamura | B01J 23/63 |
| 10,625,243 B2* | 4/2020 | Clowes | B01J 35/04 |
| 2001/0053340 A1 | 12/2001 | Noda et al. | |
| 2006/0217263 A1 | 9/2006 | Kawamoto et al. | |
| 2009/0087365 A1* | 4/2009 | Klingmann | B01D 53/945 422/180 |
| 2011/0287928 A1 | 11/2011 | Nakatsuji et al. | |
| 2018/0028972 A1 | 2/2018 | Kitamura et al. | |
| 2019/0015820 A1 | 1/2019 | Kasuya et al. | |
| 2019/0193057 A1* | 6/2019 | Hoshino | B01J 37/0248 |
| 2020/0271067 A1* | 8/2020 | Lee | B01D 53/945 |
| 2020/0276568 A1* | 9/2020 | Makino | B01J 37/0244 |
| 2020/0346166 A1* | 11/2020 | Chen | B01J 35/0006 |
| 2021/0023543 A1* | 1/2021 | Clowes | C01G 25/006 |

FOREIGN PATENT DOCUMENTS

| | | |
|---|---|---|
| EP | 2368630 A1 | 9/2011 |
| EP | 2436441 A1 | 4/2012 |
| JP | H0243951 A | 2/1990 |
| JP | H0810566 A | 1/1996 |
| JP | H11151439 A | 6/1999 |
| JP | 2001070791 A | 3/2001 |
| JP | 2006263582 A | 10/2006 |
| JP | 2009255073 A | 11/2009 |
| JP | 2010058110 A | 3/2010 |
| JP | 2013-039552 A | 2/2013 |
| JP | 2018527164 A | 9/2018 |
| WO | 2010071205 A1 | 6/2010 |
| WO | 2010137657 A1 | 12/2010 |
| WO | 2016210221 A1 | 12/2016 |
| WO | 2017126631 A1 | 7/2017 |

OTHER PUBLICATIONS

The Extended European Search Report dated May 25, 2022, by the European Patent Office in corresponding European Patent Application No. 19867645.4. (7 pages).

Notice of Reasons for Rejection dated Jun. 6, 2022, by the Japanese Patent Office in corresponding Japanese Patent Application No. 2020-549206 and an English translation of the Notice. (8 pages).

* cited by examiner

Amount Of Ce In The Second Catalyst Layer (g/L)

EXHAUST GAS PURIFICATION CATALYST, EXHAUST GAS PURIFICATION METHOD, AND PRODUCTION METHOD FOR EXHAUST GAS PURIFICATION CATALYST

TECHNICAL FIELD

The present invention relates to an exhaust gas purification catalyst, an exhaust gas purification method, and a production method for an exhaust gas purification catalyst.

BACKGROUND OF THE INVENTION

Various catalysts are used to purify exhaust gas discharged from an internal combustion engine of an automobile or the like. For gasoline engine vehicles, three-way catalysts which simultaneously purify the three components of carbon monoxide (CO), hydrocarbons (HC), and nitrogen oxides ($NO_x$)) in exhaust gas are known. The main components of a three-way catalyst are a precious metal such as rhodium or palladium and an oxygen storage component (OSC) such as a cerium/zirconium composite oxide.

Exhaust gas regulations are tightening worldwide year by year and are expected to tighten further in the future. Therefore, there is a demand for the development of catalysts that exhibit superior exhaust gas purification performance. In recent years, in order to improve the exhaust gas purification performance of three-way catalysts, catalysts have been proposed in which, in a two-layer catalyst configured of two layers of an upper layer and a lower layer disposed on a refractory three-dimensional structure, Rh and a Ce/Zr/Nd composite oxide are supported on the upper layer and Pd is supported on the lower layer to promote a steam reforming (also called "SR") reaction and to promote a reduction reaction of $NO_x$. (See Patent Document 1)

PRIOR ART DOCUMENTS

Patent Documents

Patent Document 1: Japanese Unexamined Patent Application Publication No. 2006-263582 A

SUMMARY OF THE INVENTION

Technical Problem

Thus, although it is known that promoting the SR reaction improves the exhaust gas purification performance of a catalyst, this exhaust gas purification performance was not sufficient.

The present invention was conceived in light of the problem described above, and an objective thereof is to provide an exhaust gas purification catalyst having improved exhaust gas purification performance, an exhaust gas purification method capable of efficiently purifying exhaust gas, and a production method for an exhaust gas purification catalyst having improved exhaust gas purification performance.

Solution to Problem

The present inventors conducted diligent research to solve the problem described above. As a result, the present inventors found that the SR reaction can be promoted to a greater degree than a water gas shift (also called "WGS") reaction by optimizing the arrangement of rhodium and palladium and the amount of cerium in the exhaust gas purification catalyst. The present inventors also found that the exhaust gas purification performance of the exhaust gas purification catalyst can be improved by the above optimization.

In view of these findings, the following aspects are employed in the present application to solve the problem described above.

(1) The exhaust gas purification catalyst according to a first aspect includes: a refractory three-dimensional structure; a first catalyst layer provided on a surface of the refractory three-dimensional structure; and a second catalyst layer provided on the opposite side of the first catalyst layer as the refractory three-dimensional structure; wherein: the first catalyst layer includes a composite oxide containing cerium and zirconium and a rhodium element; the second catalyst layer includes a composite oxide containing cerium and zirconium and a palladium element; and the amount of cerium contained in the second catalyst layer is not less than 10 g and not greater than 25 g per 1 liter of the refractory three-dimensional structure in terms of cerium dioxide.

(2) In the exhaust gas purification catalyst according to the aspect described above, the composite oxide of the first catalyst layer may contain yttrium, and the amount of yttrium contained in the first catalyst layer may be not less than 0.1 g/L and not greater than 15 g/L per 1 liter of the refractory three-dimensional structure in terms of yttrium oxide ($Y_2O_3$).

(3) In the exhaust gas purification catalyst according to the aspect described above, the ratio of the mass of the composite oxide containing cerium and zirconium contained in the second catalyst layer to the mass of the composite oxide containing cerium and zirconium contained in the first catalyst layer may be not less than 1.1 and not greater than 3.8.

(4) In the exhaust gas purification catalyst according to the aspect described above, the second catalyst layer may contain a group II metal element.

(5) In the exhaust gas purification catalyst according to the aspect described above, the second catalyst layer may contain aluminum oxide, and the amount of aluminum oxide contained in the second catalyst layer may be not greater than 80 g per 1 liter of the refractory three-dimensional structure.

(6) In the exhaust gas purification catalyst according to the aspect described above, the amount of hydrogen produced by a steam reforming (SR) reaction may be greater than the amount of hydrogen produced by a water gas shift (WGS) reaction.

(7) In the exhaust gas purification catalyst according to the aspect described above, the S/W ratio may be not less than 1.8.

(8) The exhaust gas purification method according to a second aspect uses the exhaust gas purification catalyst described above.

(9) The production method for an exhaust gas purification catalyst according to a third aspect includes: a first step of applying a first slurry to a surface of a refractory three-dimensional structure and drying and calcining the applied first slurry to form the first catalyst layer; and a second step of applying a second slurry to the surface of the first catalyst layer and drying and calcining the applied second slurry to form the second catalyst layer; wherein: the first slurry comprises a composite oxide containing cerium and zirconium and rhodium nitrate; the second slurry comprises a composite oxide containing cerium and zirconium and palladium nitrate; and the second step is performed such that the amount of cerium contained in the second catalyst layer is not less than 10 g and not greater than 25 g per 1 liter of the refractory three-dimensional structure in terms of cerium dioxide.

Advantageous Effects of the Invention

The exhaust gas purification catalyst according to the aspect described above can provide excellent exhaust gas purification performance.

In addition, the exhaust gas purification method according to the aspect described above can efficiently purify exhaust gas. Further, the production method for an exhaust gas purification catalyst according to the aspect described above can provide an exhaust gas purification catalyst having excellent exhaust gas purification performance.

DESCRIPTION OF EMBODIMENTS

Embodiments of the present invention will be described in detail hereinafter with reference to the drawings as needed. To facilitate an understanding of the features of the present invention, the drawings used in the following descriptions may show enlarged portions serving as the features, and the dimensional proportions of each of the components may differ from the actual dimensions. The materials, dimensions and the like illustrated in the following descriptions are examples. The present invention is not limited thereto, and may be implemented by making appropriate changes within a scope that does not change the gist thereof.

The exhaust gas purification catalyst according to the present embodiment promotes the steam reforming (SR) reaction to a greater degree than the water gas shift (WGS) reaction. In addition, the exhaust gas purification catalyst according to the present embodiment promotes a reduction reaction or the like of nitrogen oxides ($NO_x$) by means of $H_2$ produced as a result of the WGS reaction and the SR reaction. Here, each reaction can be expressed as follows.

SR reaction: $C_nH_m + nH_2O \rightarrow nCO + ((m/2)+n)H_2$

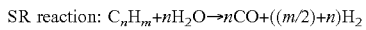

In the case of propylene

WGS reaction: 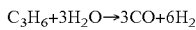

$NO_x$ reduction reaction by $H_2$: 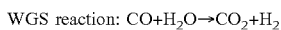

Here, a catalyst that promotes the SR reaction to a greater degree than the WGS reaction is a catalyst in which the amount of hydrogen produced by the SR reaction is greater than the amount of hydrogen produced by the WGS reaction when a gas is brought into contact with the catalyst. The amount of hydrogen produced by the WGS reaction can be calculated from the CO purification rate in the WGS reaction. In addition, the amount of hydrogen produced by the SR reaction can be calculated by the hydrocarbon purification rate in the SR reaction. The ratio of the amount of hydrogen produced by the SR reaction to the amount of hydrogen produced by the WGS reaction is defined as the S/W ratio. The S/W ratio is preferably greater than 1, more preferably not less than 1.8 and not greater than 5.0, even more preferably not less than 1.9 and not greater than 3.0, and most preferably not less than 2.0 and not greater than 2.5. The catalyst of the present invention, which has an S/W ratio within the range described above, efficiently produces $H_2$ via the SR reaction and also produces $H_2$ via the WGS reaction. Therefore, the catalyst of the present invention can efficiently reduce $NO_x$, by means of $H_2$. Conventional catalysts are susceptible to WGS reactions and tend to have an S/W ratio of 1.7 or lower.

The S/W ratio can be specifically calculated as follows.

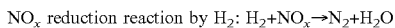

Each parameter in the formula is as follows.

Figure 1:
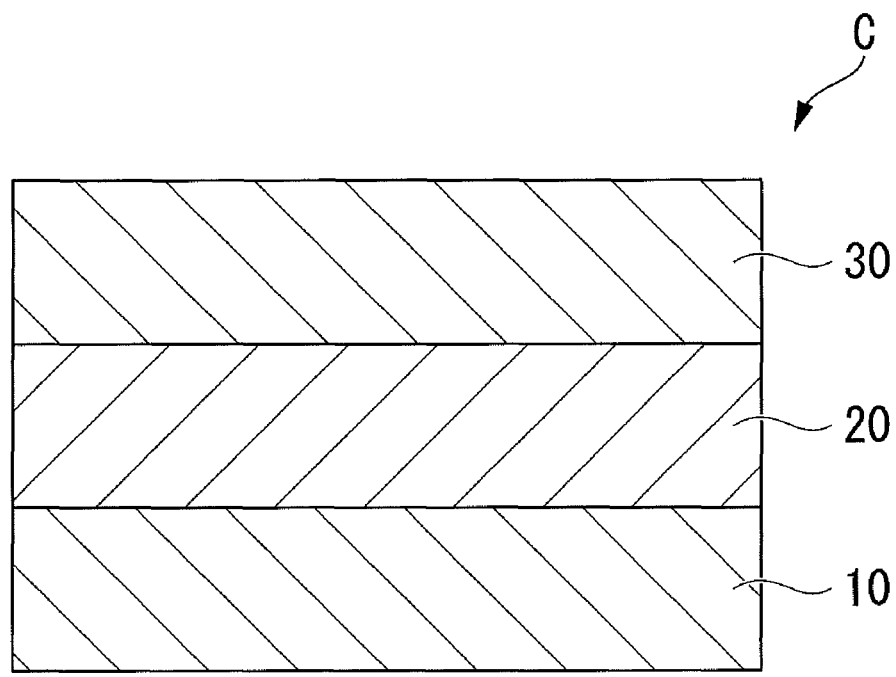
FIG. 1 is a cross-sectional schematic view of an exhaust gas purification catalyst C according to an embodiment.

$C_{CO}$: Molar concentration of CO in the WGS reaction at the catalyst inlet $V_{CO}$: CO purification rate in the WGS reaction at the catalyst outlet $C_{HC}$: Molar concentration of $C_nH_m$ in the SR reaction at the catalyst inlet $V_{HC}$: $C_nH_m$ purification rate in the SR reaction at the catalyst outlet Exhaust Gas Purification Catalyst FIG. 1 illustrates a cross-sectional schematic view of an exhaust gas purification catalyst C according to the present embodiment. The exhaust gas purification catalyst C illustrated in FIG. 1 may be used to purify exhaust gas from an internal combustion engine using gasoline as a fuel. In particular, the exhaust gas purification catalyst C according to the present embodiment is suitable for purifying exhaust gas from an MPI (Multi Port Injection) engine. As illustrated in FIG. 1, the exhaust gas purification catalyst C according to the present embodiment includes a refractory three-dimensional structure 10, a first catalyst layer 20, and a second catalyst layer 30.

Refractory Three-Dimensional Structure

The refractory three-dimensional structure 10 may be the same as that used in a typical exhaust gas purification catalyst. The total length of the refractory three-dimensional structure 10 is not particularly limited, however, the total length is preferably not less than 10 mm and not greater than 1000 mm, more preferably not less than 15 mm and not greater than 300 mm, and even more preferably not less than 20 mm and not greater than 150 mm. The refractory three-dimensional structure 10 may have a honeycomb-like structure.

The number of holes in the aperture of the refractory three-dimensional structure 10 may be set within an appropriate range in consideration of the type of the exhaust gas to be treated, the gas flow rate, the pressure loss, the purification rate, and the like. For example, a cell density (number of cells/unit cross-sectional area) of not less than 100 cells/square inch and not greater than 1200 cells/square inch is sufficient for use, and the cell density is preferably not less than 200 cells/square inch and not greater than 900 cells/square inch and even more preferably not less than 400 cells/square inch and not greater than 700 cells/square inch. The shape (cell shape) of the gas passage holes of the refractory three-dimensional structure 10 may be hexagonal, rectangular, triangular, corrugated, or the like.

Either a flow-through type (open-flow type) or a wall-flow type may be used as the refractory three-dimensional structure 10. In a flow-through type refractory three-dimensional structure 10, the gas flow path connects from the gas introduction side to the gas discharge side such that gas can pass through the flow channel as it is. Meanwhile, in a wall-flow type refractory three-dimensional structure 10, the gas entry side is sealed in a checker pattern, where if one side of a gas flow path is open, then the other side of the same flow path is closed. The wall-flow type refractory three-dimensional structure 10 allows gas to flow to another gas flow path through fine holes present in the wall surfaces of the gas flow path, and exhaust gas introduced from the holes exits the refractory three-dimensional structure 10 through the other flow path. The flow-through type refractory three-dimensional structure 10 has lower air resistance and lower pressure loss of the exhaust gas. In addition, a wall-flow type structure can also filter out particulate components contained in the exhaust gas.

The material of the refractory three-dimensional structure 10 may be the same as that used in a typical exhaust gas purification catalyst. The refractory three-dimensional structure 10 may be made of metal, ceramic, or the like, preferably cordierite, stainless steel, silicon carbide (SiC), mullite, alumina (α-alumina), or silica, and more preferably cordierite, stainless steel, or SiC. The durability of the catalyst improves when the material of the refractory three-dimensional structure 10 is cordierite, stainless steel, or SiC.

Catalyst Layer

First Catalyst Layer

The first catalyst Layer 20 is provided on the surface of the refractory three-dimensional structure 10. Another layer may be provided between the first catalyst layer 20 and the refractory three-dimensional structure 10.

The first catalyst layer 20 includes a composite oxide containing cerium and zirconium and rhodium (Rh). Rhodium promotes the water gas shift (WGS) reaction and the $NO_x$ reduction reaction.

In order to achieve sufficient catalyst performance while reducing cost, the amount of rhodium contained in the first catalyst layer 20 is preferably not less than 0.1 g/L ("g/L" represents the mass of the component per 1 liter of volume of the refractory three-dimensional structure 10; hereinafter, "g/L" is also similarly used for other components) and not greater than 10 g/L, more preferably not less than 0.2 g/L and not greater than 3 g/L, and even more preferably not less than 0.3 g/L and not greater than 1 g/L. A known analytical technique can be used as the method for measuring the metal elements. For example, ICP emission spectroscopy or fluorescence X-ray analysis can be used.

Nitrates, chloride salts, or the like can be used as the raw materials of the precious metals (palladium and rhodium) used in the first catalyst layer and the second catalyst layer described below, and nitrates are more preferable.

The rhodium in the first catalyst layer 20 may be present in the first catalyst layer 20 in a state supported on a carrier consisting of a composite oxide containing cerium and zirconium and/or an inorganic oxide other than a composite oxide containing cerium and zirconium, and is preferably supported on a composite oxide containing cerium and zirconium. The WGS reaction tends to progress more readily as a result of rhodium being supported on a composite oxide containing cerium and zirconium.

The composite oxide in the first catalyst layer 20 contains cerium and zirconium. Since the composite oxide in the first catalyst layer 20 contains zirconium, oxygen deficiencies in the cerium tend to occur, and the WGS reaction can be promoted.

In addition, the composite oxide containing cerium and zirconium in the first catalyst layer 20 preferably further contains a rare earth element such as lanthanum, yttrium, neodymium, or praseodymium. The heat resistance can be improved as a result of the composite oxide in the first catalyst layer 20 containing a rare earth element. In particular, when the composite oxide in the first catalyst layer 20 contains lanthanum and/or yttrium, the heat resistance of the composite oxide containing cerium and zirconium in the first catalyst layer 20 improves, and therefore, the WGS reaction is promoted even after the catalyst is exposed to a high-temperature gas.

Here, a composite oxide in the present invention refers to a composite of multiple metal oxides. The composite oxide preferably contains multiple types of metals, and the composite oxide may have a uniform crystal structure. The composite oxide may contain cerium and zirconium and may further contain a rare earth element. The composite oxide in the first catalyst layer 20 preferably has a cubic structure, a cubic fluorite structure, a tetragonal structure, or a monoclinic crystal structure, more preferably a cubic or a cubic fluorite structure, and even more preferably a cubic fluorite structure.

The abundance ratio of each element contained in the composite oxide in the first catalyst layer 20 is not particularly limited. However, in order to achieve both heat resistance and the function of promoting the SR reaction to a greater degree than the WGS reaction, the amount of cerium contained in the composite oxide in the first catalyst layer 20 in terms of cerium dioxide ($CeO_2$) is preferably not less than 10 mass % and not greater than 49 mass %, more preferably not less than 20 mass % and not greater than 45 mass %, and even more preferably not less than 22 mass % and not greater than 32 mass % with respect to the mass of the composite oxide in the first catalyst layer 20.

Similarly, the amount of zirconium contained in the composite oxide in the first catalyst layer 20 in terms of zirconium dioxide ($ZrO_2$) is preferably not less than 21 mass % and not greater than 89 mass %, more preferably not less than 51 mass % and not greater than 71 mass %, and even more preferably not less than 59 mass % and not greater than 63 mass % with respect to the mass of the composite oxide. In addition to cerium and zirconium, yttrium and lanthanum are preferably contained in the composite oxide. In addition, neodymium, praseodymium, or the like may also be included. When yttrium, lanthanum, neodymium, or praseodymium is included, the total amount including these elements is 100 mass %.

Similarly, the amount of yttrium contained in the composite oxide in the first catalyst layer 20 in terms of yttrium oxide ($Y_2O_3$) is preferably not less than 0.5 mass % and not greater than 20 mass %, more preferably not less than 2 mass % and not greater than 15 mass %, and even more preferably not less than 5 mass % and not greater than 13 mass % with respect to the mass of the composite oxide in the first catalyst layer 20.

Similarly, the amount of lanthanum contained in the composite oxide in the first catalyst layer 20 in terms of lanthanum oxide ($La_2O_3$) is preferably not less than 0.5 mass % and not greater than 10 mass %, more preferably not less than 1 mass % and not greater than 8 mass %, and even more preferably not less than 1.5 mass % and not greater than 6 mass % with respect to the mass of the composite oxide in the first catalyst layer 20.

The amount of each element contained in the composite oxide in the first catalyst layer 20 is not particularly limited.

However, the amount of cerium contained in the composite oxide in the first catalyst layer 20 in terms of cerium dioxide is preferably not less than 1 g/L and not greater than 20 g/L, more preferably not less than 3 g/L and not greater than 15 g/L, and even more preferably not less than 4 g/L and not greater than 10 g/L with respect to the volume of the refractory three-dimensional structure 10. When the amount of the cerium element contained in the first catalyst layer 20 is within the range described above, the composite oxide can promote the WGS reaction.

The amount of zirconium contained in the composite oxide in the first catalyst layer 20 in terms of zirconium dioxide is preferably not less than 1 g/L and not greater than 60 g/L, more preferably not less than 3 g/L and not greater than 47 g/L, and even more preferably not less than 8 g/L and not greater than 27 g/L with respect to the volume of the refractory three-dimensional structure 10. When the amount of the zirconium element contained in the first catalyst layer 20 is within the range described above, the composite oxide can promote the WGS reaction.

The composite oxide in the first catalyst layer 20 preferably contains yttrium. The amount of yttrium contained in the first catalyst layer 20 in terms of yttrium oxide ($Y_2O_3$) is preferably not less than 0.1 g/L and not greater than 15 g/L, more preferably not less than 0.5 g/L and not greater than 8 g/L, and even more preferably not less than 0.9 g/L and not greater than 3.9 g/L with respect to the volume of the refractory three-dimensional structure 10. When the amount of the yttrium element contained in the first catalyst layer 20 is within the range described above, the composite oxide can promote the WGS reaction.

The form of the composite oxide containing cerium and zirconium that supports rhodium in the first catalyst layer 20 is not particularly limited. However, in order to uniformly disperse and support rhodium serving as a catalyst component, it is preferable to support rhodium on a composite oxide containing cerium and zirconium having a large BET (Brunauer-Emmett-Teller) specific surface area. Specifically, the BET specific surface area of the composite oxide containing cerium and zirconium is preferably not less than 20 $m^2$/g and not greater than 150 $m^2$/g, more preferably not less than 25 $m^2$/g and not greater than 110 $m^2$/g, and even more preferably not less than 35 $m^2$/g and not greater than 85 $m^2$/g.

A substance that is ordinarily used in exhaust gas purification catalysts may be used as the inorganic oxide (other than a composite oxide containing cerium and zirconium) that supports rhodium in the first catalyst layer 20. For example, aluminas such as α-alumina, δ-aluminas, δ-alumina, η-alumina, and θ-alumina, single oxides such as zirconia and silicon oxide (silica), composite oxides such as zirconia-alumina, lanthana-alumina, and lanthana-zirconia or mixtures thereof, and mixtures thereof may be used. Preferable is δ-alumina, θ-alumina, zirconia, zirconia-alumina, or lanthana-alumina.

The form of the inorganic oxide (other than a composite oxide containing cerium and zirconium) that supports rhodium in the first catalyst layer 20 is not particularly limited. However, in order to uniformly disperse and support rhodium serving as a catalyst component, it is preferable to support rhodium on an inorganic oxide having a large BET (Brunauer-Emmett-Teller) specific surface area. Specifically, the BET specific surface area of the inorganic oxide is preferably not less than 20 $m^2$/g and not greater than 350 $m^2$/g, more preferably not less than 30 $m^2$/g and not greater than 250 $m^2$/g, and even more preferably not less than 35 $m^2$/g and not greater than 180 $m^2$/g.

In addition, the average particle size of the inorganic oxide is not particularly limited, however, when taking into consideration the uniformity of the slurry or the like, the average particle size of the inorganic oxide is preferably not less than 0.5 μm and not greater than 150 μm, more preferably not less than 1μ and not greater than 100 μm, and even more preferably not less than 2 μm and not greater than 50 μm. Here, the "average particle size" in the present specification is the average value of the particle size measured by laser diffraction.

The amount of the inorganic oxide (other than a composite oxide containing cerium and zirconium) that supports rhodium in the first catalyst layer 20 is not particularly limited. However, the amount of the inorganic oxide that is used to support rhodium is preferably not less than 20 g/L and not greater than 140 g/L and even more preferably not less than 30 g/L and not greater than 100 g/L with respect to the volume of the refractory three-dimensional structure 10. When the amount that is used is within this range, rhodium can be sufficiently dispersed, and a high catalytic performance of rhodium can be achieved.

Second Catalyst Layer

The second catalyst layer 30 is provided on the opposite side of the first catalyst layer 20 as the refractory three-dimensional structure 10. Another layer may be provided between the first catalyst layer 20 and the second catalyst layer 30.

The second catalyst layer 30 includes a composite oxide containing cerium and zirconium and a palladium element (Pd). Palladium promotes the steam reforming (SR) reaction, the water gas shift (WGS) reaction, and the oxidation reactions of CO and HC.

In order to achieve sufficient catalytic performance while reducing cost, the amount of palladium contained in the second catalyst layer 30 is preferably not less than 0.1 g/L and not greater than 20 g/L, more preferably not less than 1 g/L and not greater than 10 g/L, and even more preferably not less than 3 g/L and not greater than 8 g/L with respect to the volume of the refractory three-dimensional structure 10.

The palladium in the second catalyst layer 30 may be present in the second catalyst layer 30 in a state supported on a carrier consisting of a composite oxide containing cerium and zirconium and/or an inorganic oxide other than a composite oxide containing cerium and zirconium, and is preferably supported on a composite oxide containing cerium and zirconium. The WGS reaction and the SR reaction tend to progress more readily when supported on a composite oxide containing cerium and zirconium.

The composite oxide containing cerium and zirconium in the second catalyst layer 30 promotes the SR reaction and the WGS reaction. The same composite oxide as the composite oxide containing cerium and zirconium in the first catalyst layer 20 can be used as the composite oxide containing cerium and zirconium in the second catalyst layer 30. The composition of the composite oxide of the second catalyst layer 30 may be the same as or different than the composition of the composite oxide of the first catalyst layer 20.

The composite oxide in the first catalyst layer 20 preferably contains yttrium. In addition, both the composite oxide of the first catalyst layer 20 and the composite oxide of the second catalyst layer 30 may contain yttrium. When the composite oxide contains yttrium, the heat resistance of the composite oxide improves, and the SR reaction and the WGS reaction can be promoted even after being exposed to a high-temperature exhaust gas.

The abundance ratio of each element contained in the composite oxide in the second catalyst layer 30 is not particularly limited. However, in order to achieve both heat resistance and the function of promoting the SR reaction to a greater degree than the WGS reaction, the amount of cerium contained in the composite oxide in the second catalyst layer 30 in terms of cerium dioxide is preferably not less than 10 mass % and not greater than 49 mass %, more preferably not less than 20 mass % and not greater than 47 mass %, and even more preferably not less than 30 mass % and not greater than 40 mass % with respect to the mass of the composite oxide in the second catalyst layer 30.

Similarly, the amount of zirconium contained in the composite oxide in the second catalyst layer 30 in terms of zirconium dioxide is preferably not less than 21 mass % and not greater than 89 mass %, more preferably not less than 30 mass % and not greater than 71 mass %, and even more preferably not less than 40 mass % and not greater than 63 mass % with respect to the mass of the composite oxide. In addition to cerium and zirconium, yttrium and lanthanum are preferably contained. In addition, neodymium, praseodymium, or the like may also be included. When yttrium, lanthanum, neodymium, or praseodymium is included, the total amount including these elements is 100 mass %.

Similarly, the amount of yttrium contained in the composite oxide in the second catalyst layer 30 in terms of yttrium oxide is preferably not less than 0 mass % and not greater than 15 mass %, more preferably not less than 1 mass % and not greater than 10 mass %, more preferably not less than 2 mass % and not greater than 10 mass %, and even more preferably not less than 4 mass % and not greater than 8 mass % with respect to the mass of the composite oxide in the second catalyst layer 30.

Similarly, the amount of lanthanum contained in the composite oxide in the second catalyst layer 30 in terms of lanthanum oxide ($La_2O_3$) is preferably not less than 0.5 mass % and not greater than 20 mass %, more preferably not less than 2 mass % and not greater than 15 mass %, and even more preferably not less than 5 mass % and not greater than 13 mass % with respect to the mass of the composite oxide in the second catalyst layer 30.

The amount of cerium contained in the second catalyst layer 30 in terms of cerium dioxide is not less than 10 g and not greater than 25 g, preferably not less than 10 g and not greater than 22 g, more preferably not less than 10 g and not greater than 18 g, more preferably not less than 10 g and not greater than 15 g, and even more preferably not less than 11 g and not greater than 13 g per 1 liter of the refractory three-dimensional structure 10.

When the amount of the cerium element contained in the second catalyst layer 30 is within the range described above, the exhaust gas purification catalyst C can exhibit high $NO_x$ purification performance.

The amount of yttrium contained in the second catalyst layer 30 in terms of yttrium oxide ($Y_2O_3$) is preferably not less than 0 g/L and not greater than 15 g/L, more preferably not less than 0.3 g/L and not greater than 8.0 g/L, and even more preferably not less than 0.5 g/L and not greater than 3.6 g/L with respect to the volume of the refractory three-dimensional structure 10. When the amount of the yttrium element contained in the second catalyst layer 30 is within the range described above, the composite oxide can promote the SR reaction.

The form of the composite oxide containing cerium and zirconium in the second catalyst layer 30 is not particularly limited. However, in order to uniformly disperse and support palladium serving as a catalyst component, it is preferable to support palladium on a composite oxide containing cerium and zirconium having a large BET specific surface area. Specifically, the BET specific surface area of the composite oxide containing cerium and zirconium is preferably not less than 20 $m^2/g$ and not greater than 150 $m^2/g$, more preferably not less than 25 $m^2/g$ and not greater than 110 $m^2/g$, and even more preferably not less than 35 $m^2/g$ and not greater than 85 $m^2/g$.

The composite oxide in the second catalyst layer 30 preferably has a cubic structure, a cubic fluorite structure, a tetragonal structure, or a monoclinic crystal structure, more preferably a cubic structure, a cubic fluorite structure, or a tetragonal structure, and even more preferably a cubic fluorite structure.

The amount of the composite oxide containing cerium and zirconium contained in the second catalyst layer 30 is preferably not less than 22 g and not greater than 85 g, more preferably not less than 25 g and not greater than 75 g, and most preferably not less than 30 g and not greater than 62 g per liter of the refractory three-dimensional structure. Within such a range, the SR reaction can be promoted.

The total amount of the composite oxides containing cerium and zirconium contained in the first catalyst layer 20 and the second catalyst layer 30 is preferably not less than 23 g and not greater than 140 g, more preferably not less than 30 g and not greater than 100 g, and most preferably not less than 50 g and not greater than 90 g per 1 liter of the refractory three-dimensional structure. The mass of the composite oxide containing cerium and zirconium contained in the second catalyst layer 30 is preferably greater than the mass of the composite oxide containing cerium and zirconium contained in the first catalyst layer, and the ratio of the mass of the composite oxide containing cerium and zirconium contained in the second catalyst layer to the mass of the composite oxide containing cerium and zirconium contained in the first catalyst layer 20 is preferably not less than 1.1 and not greater than 3.8, more preferably not less than 1.1 and not greater than 3.5, and most preferably not less than 1.5 and not greater than 3.0.

The amount of the inorganic oxide (other than a composite oxide containing cerium and zirconium) that supports palladium in the second catalyst layer 30 is not particularly limited. However, the amount of the inorganic oxide that is used to support palladium is preferably not less than 10 g/L and not greater than 200 g/L and even more preferably not less than 30 g/L and not greater than 80 g/L with respect to the volume of the refractory three-dimensional structure 10. When the amount that is used is within this range, palladium can be sufficiently dispersed, and a high catalytic performance of palladium can be achieved.

The second catalyst layer 30 may contain aluminum oxide as an inorganic oxide other than a composite oxide containing cerium and zirconium, and the amount of aluminum oxide contained in the second catalyst layer 30 is preferably not greater than 80 g, more preferably not less than 10 g and not greater than 70 g, and even more preferably not less than 42 g and not greater than 60 g. When the amount of aluminum oxide contained in the second catalyst layer 30 is within the range described above, the carbon monoxide contained in the exhaust gas tends to diffuse more readily to the first catalyst layer 20. As a result, the WGS reaction in the first catalyst layer 20 is promoted, and the exhaust gas purification performance of the exhaust gas purification catalyst C is improved.

The second catalyst layer 30 preferably further contains a group II metal element. When the second catalyst layer 30 contains palladium and a group II metal element, the oxidation performance of palladium is improved. The reason that the oxidation performance of palladium is improved by using palladium and a group II metal element together may be that palladium oxide is formed when the group II metal element is alkaline. The group II metal element contained in the second catalyst layer 30 is preferably magnesium, barium, or strontium, more preferably barium or strontium, and most preferably strontium. The form of the group II metal element is preferably an oxide, a carbonate, or a nitrate and more preferably an oxide. The second catalyst layer 30 most preferably contains strontium oxide (SrO).

The amount of the group II metal element in the second catalyst layer 30 in terms of oxide is not greater than 20 g, preferably not less than 0.5 g and not greater than 16 g, more preferably not less than 0.8 g and not greater than 12 g, even more preferably not less than 1.0 g and not greater than 10 g, and even more preferably not less than 5.0 g and not greater than 10 g per 1 liter of the refractory three-dimensional structure 10.

Conventionally, when an exhaust gas purification catalyst included two catalyst layers on a refractory three-dimensional structure 10, the structure was such that the catalyst layer on the refractory three-dimensional structure 10 side contained a catalyst component having a relatively low heat resistance such as palladium, and the catalyst layer on the opposite side as the refractory three-dimensional structure 10 (side close to the supplied exhaust gas) contained a catalyst component having a relatively high heat resistance such as rhodium.

On the other hand, in the exhaust gas purification catalyst C according to the present embodiment, the first catalyst layer 20 on the refractory three-dimensional structure 10 side contains a rhodium element, while the second catalyst layer 30 on the opposite side as the refractory three-dimensional structure 10 contains a palladium element, and the cerium element content of the second catalyst layer 30 is within a prescribed range. The exhaust gas purification performance of the exhaust gas purification catalyst C according to the present embodiment is improved. The reason for this can be understood as follows.

In order for the exhaust gas to undergo a catalytic reaction in the first catalyst layer 20 on the refractory three-dimensional structure 10 side, the exhaust gas must pass (diffuse) through the second catalyst layer 30 on the opposite side as the refractory three-dimensional structure 10 and reach the first catalyst layer 20. For example, since the molecular size of carbon monoxide is relatively small, it can reach the first catalyst layer 20 relatively easily. However, since hydrocarbons (HC) have a relatively large molecular size, they cannot sufficiently diffuse into the second catalyst layer 30. As a result, the second catalyst layer 30 greatly contributes to the SR reaction. Here, rhodium and palladium can both function as catalysts for the SR reaction and the WGS reaction, however, palladium is considered to have higher catalytic performance than rhodium for SR reactions. This can be understood as the reason that the exhaust gas purification catalyst C according to the present embodiment, in which the second catalyst layer 30 on the opposite side as the refractory three-dimensional structure 10 contains palladium, exhibits high exhaust gas purification performance.

In this way, the exhaust gas purification catalyst C according to the present embodiment generates a large amount of hydrogen due to the SR reaction. Accordingly, in the exhaust gas purification catalyst according to the present embodiment, the amount of hydrogen produced by the SR reaction is preferably greater than the amount of hydrogen produced by the WGS reaction in an exhaust gas purification catalyst reaction test. In this case, the $NO_x$ in the exhaust gas can be efficiently purified. Here, a model exhaust gas purification reaction test using a model exhaust gas may be used as the exhaust gas purification reaction test. The model exhaust gas purification reaction test in the present application is a test in which a mixed gas consisting of CO, NO, $C_3H_6$, $CO_2$, $O_2$, $H_2O$, and $N_2$ in balance is circulated into the exhaust gas purification catalyst C at a temperature of not lower than 400° C. and not higher than 600° C., for example, a temperature of 500° C.

Exhaust Gas Purification Method

In one embodiment, the exhaust gas purification method uses the exhaust gas purification catalyst described above and includes a step of bringing the exhaust gas purification catalyst described above into contact with exhaust gas.

The exhaust gas purification method according to the present embodiment is particularly useful for a prescribed exhaust gas. The prescribed exhaust gas is an exhaust gas containing not less than 10 ppm and not more than 50000 ppm of CO, containing not less than 10 ppm and not more than 50000 ppm of hydrocarbons in terms of carbon ($C_1$), and containing not less than 10 ppm and not more than 50000 ppm of nitrogen oxide. The CO of the exhaust gas having such a composition is rendered harmless by oxidation, the hydrocarbons are rendered harmless by oxidation, and the nitrogen oxide is rendered harmless by reduction. The amount of CO contained in the exhaust gas is preferably not less than 100 ppm and not greater than 10000 ppm and even more preferably not less than 1000 ppm and not greater than 5000 ppm. The amount of hydrocarbons contained in the exhaust gas in terms of carbon is preferably not less than 100 ppm and not greater than 10000 ppm and even more preferably not less than 3000 ppm and not greater than 7000 ppm. The amount of nitrogen oxide contained in the exhaust gas is preferably not greater than 100 ppm and not greater than 10000 ppm and even more preferably not less than 300 ppm and not greater than 3000 ppm.

The exhaust gas purification method according to the present embodiment may be used to purify exhaust gas from an internal combustion engine such as a gasoline engine, and in particular, may be used to purify exhaust gas from a gasoline engine. The exhaust gas may be supplied to the exhaust gas purification catalyst at a space velocity of not less than 1000 $h^{-1}$ and not greater than 500000 $h^{-1}$, and preferably at a space velocity of not less than 5000 $h^{-1}$ and not greater than 150000 $h^{-1}$. In addition, the exhaust gas may be supplied at a linear velocity of not less than 0.1 m/sec and not greater than 8.5 m/sec, and preferably at a linear velocity of not less than 0.2 m/sec and not greater than 4.2 m/sec. When the exhaust gas is supplied at such a flow rate, the exhaust gas can be efficiently purified.

In addition, in the exhaust gas purification method according to the present embodiment, a high-temperature exhaust gas may be supplied to promote the purification of the exhaust gas. For example, an exhaust gas at a temperature of not lower than 100° C. and not higher than 1000° C. may be supplied to the catalyst, and an exhaust gas at a temperature of not lower than 300° C. and not higher than 700° C. is preferably supplied. By supplying an exhaust gas at such a temperature, it is possible to purify the exhaust gas with high efficiency while suppressing the thermal degradation of the catalyst.

Production Method for Exhaust Gas Purification Catalyst

The production method for the exhaust gas purification catalyst C will be described in detail hereinafter.

The production method for the exhaust gas purification catalyst C according to the present embodiment includes a first step and a second step. The first step is a step of applying a first slurry onto the surface of the refractory three-dimensional structure 10 and drying and calcining the applied first slurry to form the first catalyst layer 20. The second step is a step of applying a second slurry to the surface of the first catalyst layer 20 and drying and calcining the applied second slurry to form the second catalyst layer 30.

First Step

The first slurry includes a composite oxide containing cerium and zirconium and rhodium nitrate. A substance with the same composition as that described above as the composite oxide of the first catalyst layer 20 can be used as the composite oxide. The first slurry may further contain an inorganic oxide for supporting rhodium in a highly dispersed manner. The inorganic oxide that is used may be the inorganic oxide described above as a rhodium carrier of the first catalyst layer 20, such as aluminum oxide (alumina). If necessary, the first slurry may contain a component for adjusting the pH, a surfactant, or the like.

The first slurry can be prepared by wet milling known as prior art such as a ball mill. The first slurry may be prepared using a known means such as an attritor, a homogenizer, an ultrasonic dispersion device, a sand mill, a jet mill, or a bead mill. The wet milling conditions are not particularly limited. For example, the temperature during wet milling may be not lower than 5° C. and not higher than 40° C. and preferably not lower than 15° C. and around 25° C. (room temperature). In addition, the wet milling time may be suitably set such that each component is sufficiently dispersed in the slurry. Water or an alcohol such as ethanol, 1-propanol, or 2-propanol can be used as the solvent used during wet milling, and water is particularly preferable. The amount of the solvent is not particularly limited, and an amount in which each component can be uniformly dispersed in the slurry may be used.

The concentration of the solid components in the first slurry is not particularly limited, however, the total amount of the composite oxide and the inorganic oxide in the first slurry may be, for example, not less than 0.5 mass % and not greater than 60 mass % of the entire slurry.

The first catalyst layer 20 can be obtained by applying the first slurry to the surface of the refractory three-dimensional structure 10 and then drying and calcining the applied first slurry. The structures described above can be used as the refractory three-dimensional structure 10. For example, a honeycomb carrier of cordierite can be used. Any known method can be used as the method of applying the first slurry to the surface of the refractory three-dimensional structure 10. For example, the first slurry may be applied to the surface of the refractory three-dimensional structure 10 using a wash-coating method.

The drying step is a step of primarily removing the solvent contained in the first slurry, and the calcining step is a step of primarily removing the nitric acid component contained in the first slurry. The drying step and the calcining step may be performed as separate steps or may be performed continuously as the same step. Drying and calcining may each be performed independently in any atmosphere. For example, drying and calcining may be performed in air, in a reducing atmosphere containing a reducing gas such as hydrogen, in an inert gas atmosphere, or in a vacuum. The drying temperature may be not lower than 0° C. and not higher than 300° C. and is preferably not lower than 100° C. and not higher than 200° C. The drying time may be not less than 1 minute and not more than 3 hours and is preferably not less than 10 minutes and not more than 1 hour. The calcining temperature may be not lower than 100° C. and not higher than 1200° C., preferably not lower than 300° C. and not higher than 1000° C., and even more preferably not lower than 400° C. and not higher than 700° C. The calcining time may be not less than 1 minute and not more than 10 hours and is preferably not less than 10 minutes and not more than 2 hours. If necessary, heat treatment may be performed in a reducing atmosphere after drying and calcining. The reducing atmosphere preferably contains not less than 1 vol. % and not more than 10 vol. % of a reducing gas such as hydrogen or carbon monoxide, and may be, for example, a mixed gas of 5 vol. % hydrogen and 95 vol. % nitrogen. The treatment temperature may be not lower than 200° C. and not higher than 800° C. and is preferably not lower than 300° C. and not higher than 700° C., and the treatment time may be not less than 1 hour and not more than 10 hours and is preferably not less than 2 hours and not more than 5 hours. For example, treatment may be performed at a temperature of not lower than 200° C. and not higher than 800° C. for not less than 1 hour and not more than 10 hours while circulating the reducing gas at a rate of not less than 10 ml/min and not greater than 100 ml/min.

Second Step

The second slurry contains a composite oxide containing cerium and zirconium and palladium nitrate. A substance with the same composition as that described above as the composite oxide of the second catalyst layer 30 can be used as the composite oxide. The second slurry may further contain an inorganic oxide for supporting palladium in a highly dispersed manner. The inorganic oxide that is used may be the inorganic oxide described above as a palladium carrier of the second catalyst layer 30, such as aluminum oxide (alumina). The second slurry preferably includes a compound containing a group II metal element. For example, the second slurry preferably contains strontium hydroxide. If necessary, the second slurry may contain a component for adjusting the pH, a surfactant, or the like.

The second slurry may be prepared with the same method as that of the first slurry. For example, the second slurry can be prepared with a ball mill using water as a solvent.

The concentration of the solid components in the second slurry is not particularly limited, however, the total amount of the composite oxide and the inorganic oxide in the second slurry may be, for example, not less than 0.5 mass % and not greater than 60 mass % of the entire slurry.

The second catalyst layer 30 can be obtained by applying the second slurry to the surface of the first catalyst layer 20 and drying and calcining the applied second slurry. Any known method can be used as the method of applying the second slurry to the surface of the first catalyst layer 20. For example, the second slurry may be applied using a wash-coating method.

The drying step is a step of primarily removing the solvent contained in the second slurry, and the calcining step is a step of primarily removing the nitric acid component contained in the second slurry. The drying step and the calcining step may be performed as separate steps or may be performed continuously as the same step. Drying and calcining may be performed under the same conditions as in the first step. If necessary, heat treatment may be performed in a reducing atmosphere in the same manner as in the first step after drying and calcining.

Embodiments of the present invention have been described in detail above with reference to the drawings, however, the configurations and combinations thereof in each of the embodiments are merely examples. Additions, omissions, substitutions, and other changes may be made to the configurations within a scope that does not depart from the gist of the present invention.

EXAMPLES

Example 1

Production of Exhaust Gas Purification Catalyst

A composite oxide containing cerium dioxide ($CeO_2$), zirconium dioxide ($ZrO_2$), lanthanum oxide ($La_2O_3$), and yttrium oxide ($Y_2O_3$) at a mass ratio of 30:60:2:8 was prepared. The BET specific surface area of the composite oxide was 79.5 $m^2/g$, and the crystal structure of the composite oxide was a cubic fluorite type structure. Next, a rhodium nitrate aqueous solution, aluminum oxide (alumina, $Al_2O_3$), and the composite oxide were weighed such that the mass ratio of rhodium, aluminum oxide, and the composite oxide was 0.50:75.84:20.0. Here, the average particle size of the aluminum oxide that was used was 73 μm, and the BET specific surface area thereof was 154 $m^2/g$. In addition, the average particle size of the composite oxide was 11 μm. The weighed aluminum oxide and the composite oxide were dispersed in water, and a rhodium nitrate aqueous solution was added to the dispersion. After the obtained solution was stirred with a three-one motor, the solution was wet-milled with a ball mill to produce a first slurry.

Next, a composite oxide containing cerium dioxide, zirconium dioxide, lanthanum oxide, and yttrium oxide at a mass ratio of 36:48:10:6 was prepared. The BET specific surface area of the composite oxide was 79.4 $m^2/g$, and the crystal structure of the composite oxide was a cubic fluorite type structure. Next, a palladium nitrate aqueous solution, aluminum oxide, the composite oxide, and strontium hydroxide were weighed such that the mass ratio of palladium, aluminum oxide, the composite oxide, and strontium oxide (SrO) was 5.5:52.8:58.6:8.5. The weighed aluminum oxide, composite oxide, and strontium hydroxide were dispersed in water, and a palladium nitrate aqueous solution was added to the dispersion. After the obtained solution was stirred with a three-one motor, the solution was wet-milled with a ball mill to produce a second slurry.

Next, a cordierite refractory three-dimensional structure having a diameter of 24 mm, a length of 30 mm, a cylindrical shape (0.0136 L), 600 cells per square inch, a tetragonal cell shape, and a cell wall thickness of 3 mil was prepared.

The first slurry was applied to the refractory three-dimensional structure, dried for 15 minutes in an air atmosphere at 150° C., and then calcined for 30 minutes in an air atmosphere at 550° C. to form a first catalyst layer.

Next, the second slurry was applied to the first catalyst layer, and then dried and calcined in the same manner as with the first slurry to form a second catalyst layer. An exhaust gas purification catalyst was thus obtained. The ratio of the mass of the composite oxide containing cerium and zirconium contained in the second catalyst layer to the mass of the composite oxide containing cerium and zirconium contained in the first catalyst layer of the catalyst was 2.9.

Example 2

An exhaust gas purification catalyst was produced in the same manner as in Example 1 with the exception that the mass ratio of the compound contained in the second slurry was changed such that the ratio of palladium, aluminum oxide, the composite oxide, and strontium oxide was 5.5:52.8:41.7:8.5. The ratio of the mass of the composite oxide containing cerium and zirconium contained in the second catalyst layer to the mass of the composite oxide containing cerium and zirconium contained in the first catalyst layer of the catalyst was 2.1.

Example 3

An exhaust gas purification catalyst was produced in the same manner as in Example 1 with the exception that the mass ratio of the compound contained in the second slurry was changed such that the ratio of palladium, aluminum oxide, the composite oxide, and strontium oxide was 5.5:52.8:33.3:8.5. The ratio of the mass of the composite oxide containing cerium and zirconium contained in the second catalyst layer to the mass of the composite oxide containing cerium and zirconium contained in the first catalyst layer of the catalyst was 1.7.

Comparative Example 1

An exhaust gas purification catalyst was produced in the same manner as in Example 1 with the exception that the mass ratio of the compound contained in the second slurry was changed such that the ratio of palladium, aluminum oxide, the composite oxide, and strontium oxide was 5.5:52.8:20.0:8.5. The ratio of the amount of the composite oxide containing cerium and zirconium contained in the second catalyst layer to the amount of the composite oxide containing cerium and zirconium contained in the first catalyst layer of the catalyst was 1.0.

Comparative Example 2

An exhaust gas purification catalyst was produced in the same manner as in Example 1 with the exception that the mass ratio of the compound contained in the second slurry was changed such that the ratio of palladium, aluminum oxide, the composite oxide, and strontium oxide was 5.5:52.8:78.6:8.5. The ratio of the amount of the composite oxide containing cerium and zirconium contained in the second catalyst layer to the amount of the composite oxide containing cerium and zirconium contained in the first catalyst layer of the catalyst was 3.9.

Comparative Example 3

An exhaust gas purification catalyst was produced in the same manner as in Example 1 with the exception that a composite oxide was not added to the first slurry and that the mass ratio of the compound contained in the second slurry was changed such that the ratio of palladium, aluminum oxide, the composite oxide, and strontium oxide was 5.5:52.8:61.7:8.5. The first catalyst layer of this catalyst does not contain a composite oxide containing cerium and zirconium.

Comparative Example 4

An exhaust gas purification catalyst was produced in the same manner as in Example 1 with the exception that the mass ratio of the compound contained in the first slurry was changed such that the ratio of rhodium, aluminum oxide, and the composite oxide was 0.50:75.84:50.0 and that the mass ratio of the compound contained in the second slurry was changed such that the ratio of palladium, aluminum oxide, the composite oxide, and strontium oxide was 5.5:52.8:20.0:8.5. The ratio of the amount of the composite oxide containing cerium and zirconium contained in the second catalyst layer to the amount of the composite oxide containing cerium and zirconium contained in the first catalyst layer of the catalyst was 0.4.

Comparative Example 5

An exhaust gas purification catalyst was produced in the same manner as in Example 1 with the exception that the mass ratio of the compound contained in the first slurry was changed such that the ratio of rhodium, aluminum oxide, and the composite oxide was 0.50:75.84:74.0 and that the mass ratio of the compound contained in the second slurry was changed such that the ratio of palladium, aluminum oxide, the composite oxide, and strontium oxide was 5.5:52.8:0:8.5. The ratio of the amount of the composite oxide containing cerium and zirconium contained in the second catalyst layer to the amount of the composite oxide containing cerium and zirconium contained in the first catalyst layer of the catalyst was 0.

Comparative Example 6

An exhaust gas purification catalyst was produced in the same manner as in Example 1 with the exception that the first slurry contained a palladium nitrate aqueous solution, aluminum oxide, a composite oxide, and strontium oxide in amounts such that the mass ratio of palladium, aluminum oxide, the composite oxide, and strontium oxide was 5.5:52.8:20.0:8.5, and that the second slurry contained a rhodium nitrate aqueous solution, aluminum oxide, and a composite oxide in amounts such that the mass ratio of rhodium, aluminum oxide, and the composite oxide was 0.50:75.84:41.7.

Comparative Example 7

An exhaust gas purification catalyst was produced in the same manner as in Example 1 with the exception that the first slurry contained a palladium nitrate aqueous solution, aluminum oxide, a composite oxide, and strontium oxide in amounts such that the mass ratio of palladium, aluminum oxide, the composite oxide, and strontium oxide was 5.5:52.8:20.0:8.5, and that the second slurry contained a rhodium nitrate aqueous solution, aluminum oxide, and a composite oxide in amounts such that the mass ratio of rhodium, aluminum oxide, and the composite oxide was 0.50:75.84:78.6.

In the exhaust gas purification catalysts produced in each of the examples and the comparative examples, the mass of each component supported per 1 L of volume of the refractory three-dimensional structure is shown in Table 1. The units of numerical values are [g/L], and numerical values are expressed to one digit after the decimal point.

TABLE 1

| | Rh | Pd | $Al_2O_3$ | $CeO_2$ | $ZrO_2$ | $La_2O_3$ | $Y_2O_3$ | SrO | Total |
|---|---|---|---|---|---|---|---|---|---|
| First catalyst layer | | | | | | | | | |
| Example 1 | 0.5 | 0.0 | 75.8 | 6.0 | 12.0 | 0.4 | 1.6 | 0.0 | 96.3 |
| Example 2 | 0.5 | 0.0 | 75.8 | 6.0 | 12.0 | 0.4 | 1.6 | 0.0 | 96.3 |
| Example 3 | 0.5 | 0.0 | 75.8 | 6.0 | 12.0 | 0.4 | 1.6 | 0.0 | 96.3 |
| Comp. Ex. 1 | 0.5 | 0.0 | 75.8 | 6.0 | 12.0 | 0.4 | 1.6 | 0.0 | 96.3 |
| Comp. Ex. 2 | 0.5 | 0.0 | 75.8 | 6.0 | 12.0 | 0.4 | 1.6 | 0.0 | 96.3 |
| Comp. Ex. 3 | 0.5 | 0.0 | 75.8 | 0.0 | 0.0 | 0.0 | 0.0 | 0.0 | 76.3 |
| Comp. Ex. 4 | 0.5 | 0.0 | 75.8 | 15.0 | 30.0 | 1.0 | 4.0 | 0.0 | 126.3 |
| Comp. Ex. 5 | 0.5 | 0.0 | 75.8 | 22.2 | 44.4 | 1.5 | 5.9 | 0.0 | 150.3 |
| Comp. Ex. 6 | 0.0 | 5.5 | 52.8 | 6.0 | 12.0 | 0.4 | 1.6 | 8.5 | 86.8 |
| Comp. Ex. 7 | 0.0 | 5.5 | 52.8 | 6.0 | 12.0 | 0.4 | 1.6 | 8.5 | 86.8 |
| Second catalyst layer | | | | | | | | | |
| Example 1 | 0.0 | 5.5 | 52.8 | 21.1 | 28.1 | 5.9 | 3.5 | 8.5 | 125.4 |
| Example 2 | 0.0 | 5.5 | 52.8 | 15.0 | 20.0 | 4.2 | 2.5 | 8.5 | 108.5 |
| Example 3 | 0.0 | 5.5 | 52.8 | 12.0 | 16.0 | 3.3 | 2.0 | 8.5 | 100.1 |
| Comp. Ex. 1 | 0.0 | 5.5 | 52.8 | 74.2 | 9.6 | 2.0 | 1.2 | 8.5 | 86.8 |
| Comp. Ex. 2 | 0.0 | 5.5 | 52.8 | 28.3 | 37.7 | 7.9 | 4.7 | 8.5 | 145.4 |
| Comp. Ex. 3 | 0.0 | 5.5 | 52.8 | 22.2 | 29.6 | 6.2 | 3.7 | 8.5 | 128.5 |
| Comp. Ex. 4 | 0.0 | 5.5 | 52.8 | 7.2 | 9.6 | 2.0 | 1.2 | 8.5 | 86.8 |
| Comp. Ex. 5 | 0.0 | 5.5 | 52.8 | 0.0 | 0.0 | 0.0 | 0.0 | 8.5 | 66.8 |
| Comp. Ex. 6 | 0.5 | 0.0 | 75.8 | 15.0 | 20.0 | 4.2 | 2.5 | 0.0 | 118.0 |
| Comp. Ex. 7 | 0.5 | 0.0 | 75.8 | 28.3 | 37.7 | 7.9 | 4.7 | 0.0 | 155.0 |

Thermal Aging

The exhaust gas purification catalysts produced above were subjected to thermal aging. Each exhaust gas purification catalyst was placed 25 cm downstream from the exhaust port of a V-type, 8-cylinder, 4.6 liter engine. The thermal aging assumes initial deterioration of the catalyst. The temperature of the catalyst bed (in the center 1 inch from the end face on the catalyst inlet side) was set to 1000° C., and thermal aging was performed while circulating the exhaust gas for 50 hours.

Evaluation of Carbon Monoxide Purification Performance (Water Gas Shift (WGS) Reaction Test)

The carbon monoxide purification performance was evaluated for the exhaust gas purification catalyst after thermal aging using a model gas (water gas shift (WGS) reaction test). The gas conditions are shown in Table 2. The temperature 1 cm in front of the end face on the gas inflow side of the catalyst subjected to thermal aging was held at 500° C., and a mixed gas of WGS1 (with oxygen) shown in Table 2 was circulated into the catalyst for 5 minutes. The temperature of the mixed gas of WGS1 was 500° C. Next, a mixed gas of WGS2 (without oxygen) shown in Table 2 was circulated into the catalyst for 5 minutes. The temperature of the mixed gas of WGS2 was 500° C. Five minutes after WGS2 was introduced, the gas passing through the exhaust gas purification catalyst was analyzed by non-dispersive infrared spectroscopy, and the carbon monoxide purification rate due to the water gas shift reaction was determined. Hydrogen production was simultaneously confirmed by mass spectrometry.

Evaluation of Hydrocarbon Purification Performance (Steam Reforming (SR) Reaction Test)

The hydrocarbon purification performance was evaluated for the exhaust gas purification catalyst after thermal aging using a model gas (steam reforming (SR) reaction test). The gas conditions are shown in Table 2. The temperature 1 cm in front of the end face on the gas inflow side of the catalyst subjected to thermal aging was held at 500° C., and a mixed gas of SR1 (with oxygen) shown in Table 2 was circulated into the catalyst for 5 minutes. The temperature of the mixed gas of SR1 was 500° C. Next, a mixed gas of SR2 (without oxygen) shown in Table 2 was circulated into the catalyst for 5 minutes. The temperature of the mixed gas of SR2 was 500° C. Five minutes after SR2 was introduced, the gas passing through the exhaust gas purification catalyst was analyzed with a hydrogen ionization detector, and the hydrocarbon purification rate due to the steam reforming reaction was determined. Hydrogen production was simultaneously confirmed by mass spectrometry.

TABLE 2

| Gas Conditions | CO | $C_3H_6$ | $O_2$ | $H_2O$ | $NO_x$ | $N_2$ | Time |
|---|---|---|---|---|---|---|---|
| WGS1 | 10000 ppm | 0 | 0.50% | 8% | 900 ppm | Balance | 5 minutes |
| WGS2 | 10000 ppm | 0 | 0 | 8% | 900 ppm | Balance | 5 minutes |
| SR1 | 0 | 3000 ppm | 0.50% | 8% | 900 ppm | Balance | 5 minutes |
| SR2 | 0 | 3000 ppm | 0 | 8% | 900 ppm | Balance | 5 minutes |

Evaluation for Model Exhaust Gas Purification Performance

A mixed gas simulating the exhaust gas of a gasoline vehicle (in particular, exhaust gas in the acceleration zone) was circulated into the catalyst after thermal aging, and the model exhaust gas purification performance was evaluated (transient performance evaluation). The test conditions are shown in Table 3 below. The temperature 1 cm in front of the end face on the gas inflow side of the catalyst subjected to thermal aging was held at 500° C., and Lean in Table 3 was circulated into the catalyst for 8 seconds, alternating with Rich being circulated for 1 second. The gas temperatures of Lean and Rich were both 500° C. Ten cycles of each of Lean and Rich were repeated, and the average value of the carbon monoxide purification rate, the average value of the hydrocarbon purification rate, and the average value of the $NO_x$ purification rate during each Rich cycle from the 1st to the 10th cycle were calculated.

TABLE 3

| Gas Conditions | CO | NO | $C_3H_6$ | $CO_2$ | $O_2$ | $H_2O$ | $N_2$ | Time |
|---|---|---|---|---|---|---|---|---|
| Lean | 3500 ppm | 885 ppm | 1200 ppm | 8.80% | 1.50% | 8% | Balance | 8 seconds |
| Rich | 3500 ppm | 885 ppm | 1600 ppm | 8.80% | 0.30% | 8% | Balance | 1 second |

The evaluation results of carbon monoxide purification performance, the evaluation results of hydrocarbon purification performance, and the evaluation results of model exhaust gas purification performance for the exhaust gas purification catalysts produced in each of the examples and the comparative examples are shown in Table 4.

TABLE 4

| | WCS Reaction Test | SR Reaction Test | Model Exhaust Gas Purification Reaction Test | | | |
|---|---|---|---|---|---|---|
| | CO Purification Rate (%) | HC Purification Rate (%) | CO Purification Rate (%) | HC Purification Rate (%) | $NO_x$ Purification Rate (%) | S/W Ratio |
| Example 1 | 34.6 | 40.4 | 59.4 | 54.1 | 48.4 | 2.1 |
| Example 2 | 35.4 | 41.3 | 61.5 | 56.7 | 49.5 | 2.1 |
| Example 3 | 36.0 | 45.5 | 64.2 | 60.7 | 55.6 | 2.3 |
| Comp. Ex. 1 | 35.1 | 28.8 | 56.5 | 48.1 | 38.7 | 1.5 |

TABLE 4-continued

|  | WCS Reaction Test | SR Reaction Test | Model Exhaust Gas Purification Reaction Test | | | |
| --- | --- | --- | --- | --- | --- | --- |
|  | CO Purification Rate (%) | HC Purification Rate (%) | CO Purification Rate (%) | HC Purification Rate (%) | NO$_x$ Purification Rate (%) | S/W Ratio |
| Comp. Ex. 2 | 34.2 | 30.7 | 57.3 | 50.3 | 40.4 | 1.6 |
| Comp. Ex. 3 | 34.1 | 32.7 | 59.0 | 51.6 | 42.8 | 1.7 |
| Comp. Ex. 4 | 35.0 | 28.6 | 56.1 | 47.9 | 38.3 | 1.5 |
| Comp. Ex. 5 | 35.2 | 25.9 | 50.4 | 42.5 | 34.5 | 1.3 |
| Comp. Ex. 6 | 35.6 | 31.7 | 58.4 | 50.9 | 42.7 | 1.6 |
| Comp. Ex. 7 | 35.8 | 33.2 | 60.6 | 52.8 | 45.1 | 1.7 |

Figure 2:
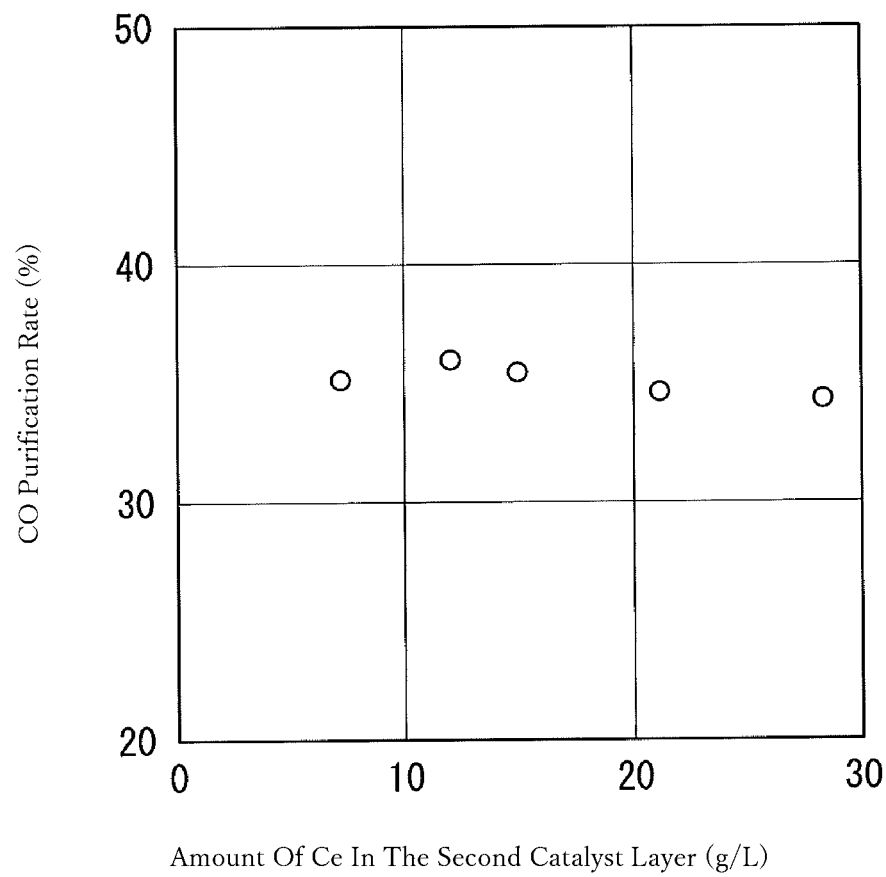
FIG. 2 is a plot of the CO purification rates of Examples 1 to 3 and Comparative Examples 1 and 2 in WGS reaction tests with respect to the amount of cerium in terms of the amount of cerium dioxide contained in the second catalyst layer.

FIG. 2 is a plot of the CO purification rates of Examples 1 to 3 and Comparative Examples 1 and 2 in WGS reaction tests with respect to the amount of cerium in terms of the amount of cerium dioxide contained in the second catalyst layer. Referring to FIG. 2, it can be seen that even when the amount of the cerium element in the second catalyst layer is varied, the CO purification does not change very much.

Figure 3:
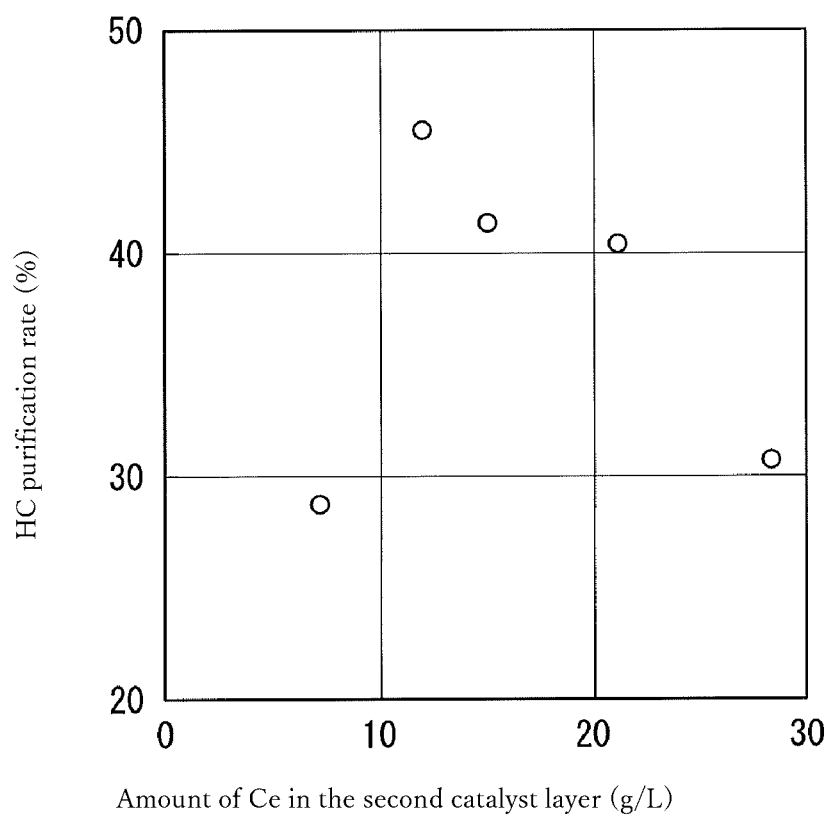
FIG. 3 is a plot of the hydrocarbon (HC) purification rates of Examples 1 to 3 and Comparative Examples 1 and 2 in SR reaction tests with respect to the amount of cerium in terms of the amount of cerium dioxide contained in the second catalyst layer.

FIG. 3 is a plot of the hydrocarbon (HC) purification rates of Examples 1 to 3 and Comparative Examples 1 and 2 in SR reaction tests with respect to the amount of cerium in terms of the amount of cerium dioxide contained in the second catalyst layer. Referring to FIG. 3, it can be seen that, in contrast to the behavior of the CO purification rate, the HC purification rate varies substantially when the amount of the cerium element in the second catalyst layer is varied.

S/W Ratio

From the results of Table 4, the catalysts of the examples had a higher S/W ratio than the catalysts of the comparative examples. It can be seen from this result that SR reactions are promoted by the catalysts of the examples to a greater degree than the catalysts of the comparative examples.

Figure 4:
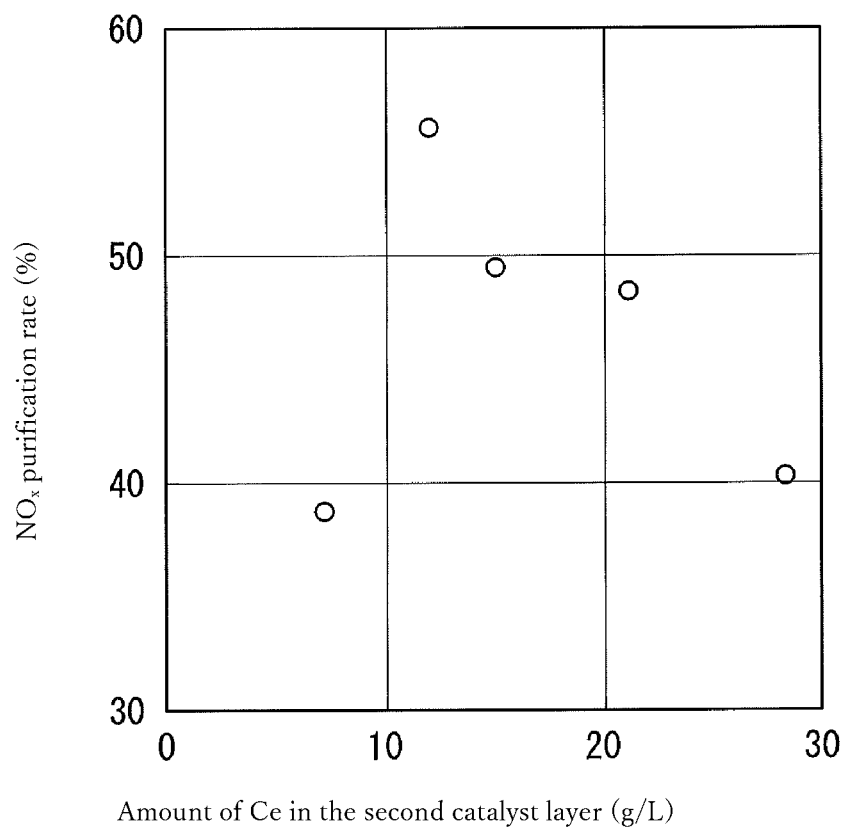
FIG. 4 is a plot of the $NO_x$ purification rates of Examples 1 to 3 and Comparative Examples 1 and 2 in model exhaust gas purification reaction tests with respect to the amount of cerium in terms of the amount of cerium dioxide contained in the second catalyst layer.

FIG. 4 is a plot of the NO$_x$ purification rates of Examples 1 to 3 and Comparative Examples 1 and 2 in model exhaust gas purification reaction tests with respect to the amount of cerium in terms of the amount of cerium dioxide contained in the second catalyst layer. Both hydrogen derived from the WGS reaction and hydrogen derived from the SR reaction contribute to NO$_x$ purification (reduction). As illustrated in FIGS. 2, 3, and the like, the amount of hydrogen derived from the WGS reaction is not substantially affected by the amount of the cerium element in the second catalyst layer. On the other hand, the amount of hydrogen derived from the SR reaction is substantially affected by the amount of the cerium element in the second catalyst layer. As a result, the behavior of the NO$_x$ purification rate with respect to the amount of cerium in the second catalyst layer is similar to the behavior of the HC purification rate with respect to the amount of cerium in the second catalyst layer.

In addition, referring to Table 4, the purification rates of Comparative Examples 1 and 2 are lower than the purification rates of Examples 1 to 3 in model exhaust gas purification reaction tests. The catalysts of Comparative Examples 1 and 2 differ from the catalysts of Examples 1 to 3 in the amount of cerium contained in the second catalyst layer. It can be seen from this result that the amount of cerium contained in the second catalyst layer has a substantial effect on the CO purification rate, the HC purification rate, and the NO$_x$ purification rate.

INDUSTRIAL APPLICABILITY

The present invention can be used to purify exhaust gas from an internal combustion engine of an automobile or the like.

DESCRIPTION OF REFERENCE NUMERALS

C Exhaust gas purification catalyst
10 Refractory three-dimensional structure
20 First catalyst layer
30 Second catalyst layer

What is claimed is:

1. An exhaust gas purification catalyst comprising:
a refractory three-dimensional structure;
a first catalyst layer provided on a surface of the refractory three-dimensional structure; and
a second catalyst layer provided on the opposite side of the first catalyst layer as the refractory three-dimensional structure; wherein:
the first catalyst layer comprises a composite oxide containing cerium and zirconium and a rhodium element;
the second catalyst layer comprises a composite oxide containing cerium and zirconium and a palladium element; and
the amount of cerium contained in the second catalyst layer is not less than 10 g and not greater than 25 g per 1 liter of the refractory three-dimensional structure in terms of cerium dioxide.

2. The exhaust gas purification catalyst according to claim 1, wherein the composite oxide of the first catalyst layer contains yttrium, and the amount of yttrium contained in the first catalyst layer is not less than 0.1 g/L and not greater than 15 g/L per 1 liter of the refractory three-dimensional structure in terms of yttrium oxide ($Y_2O_3$).

3. The exhaust gas purification catalyst according to claim 1, wherein the ratio of the mass of the composite oxide containing cerium and zirconium contained in the second catalyst layer to the mass of the composite oxide containing cerium and zirconium contained in the first catalyst layer is not less than 1.1 and not greater than 3.8.

4. The exhaust gas purification catalyst according to claim 1, wherein the second catalyst layer contains a group II metal element.

5. The exhaust gas purification catalyst according to claim 1, wherein:
the second catalyst layer contains aluminum oxide; and
the amount of aluminum oxide contained in the second catalyst layer is not greater than 80 g per 1 liter of the refractory three-dimensional structure.

6. The exhaust gas purification catalyst according to claim 1, wherein an amount of hydrogen produced by a steam reforming (SR) reaction is greater than an amount of hydrogen produced by a water gas shift (WGS) reaction.

7. The exhaust gas purification catalyst according to claim 1, wherein an S/W ratio is not less than 1.8, wherein S stands for an amount of hydrogen produced by a steam reforming (SR) reaction, and W stands for an amount of hydrogen produced by a water gas shift (WGS) reaction.

8. An exhaust gas purification method, the method including a step of bringing the exhaust gas purification catalyst according to claim 1 into contact with exhaust gas.

9. A production method for the exhaust gas purification catalyst according to claim 1, the method comprising:
- a first step of applying a first slurry to a surface of a refractory three-dimensional structure and drying and calcining the applied first slurry to form a first catalyst layer; and
- a second step of applying a second slurry to a surface of the first catalyst layer and drying and calcining the applied second slurry to form a second catalyst layer; wherein:
- the first slurry comprises a composite oxide containing cerium and zirconium and rhodium nitrate;
- the second slurry comprises a composite oxide containing cerium and zirconium and palladium nitrate; and
- the second step is performed such that the amount of cerium contained in the second catalyst layer is not less than 10 g and not greater than 25 g per 1 liter of the refractory three-dimensional structure in terms of cerium dioxide.

10. The exhaust gas purification catalyst according to claim 1, wherein the first catalyst layer and the second catalyst layer are in direct contact.

\* \* \* \* \*